United States Patent
Hijikata et al.

(10) Patent No.: US 6,633,541 B1
(45) Date of Patent: Oct. 14, 2003

(54) ASCENDING TRANSMISSION SPEED CONTROLLING METHOD AND COMMUNICATION SYSTEM IN ATM-PON SYSTEM

(75) Inventors: Toshiyuki Hijikata, Kawasaki (JP); Toshio Irie, Kawasaki (JP); Kosuke Nobuyasu, Kawasaki (JP); Yoshinori Matsunaga, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/476,732

(22) Filed: Dec. 30, 1999

(30) Foreign Application Priority Data

May 21, 1999 (JP) ............................................ 11-141107

(51) Int. Cl.[7] .......................... H04L 12/26; H04L 12/56
(52) U.S. Cl. ..................... 370/231; 370/395.1; 370/468; 398/168
(58) Field of Search ................................ 370/466, 468, 370/401, 230, 230.1, 231, 232, 395.1, 395.2, 395.21, 395.4, 236.1, 235; 359/125, 127; 398/168

(56) References Cited

U.S. PATENT DOCUMENTS

| | | | | |
|---|---|---|---|---|
| 5,600,469 A | * | 2/1997 | Yamazaki | 359/135 |
| 5,805,577 A | * | 9/1998 | Jain et al. | 370/234 |
| 6,058,114 A | * | 5/2000 | Sethuram et al. | 370/397 |
| 6,069,872 A | * | 5/2000 | Bonomi et al. | 370/236 |
| 6,178,159 B1 | * | 1/2001 | He et al. | 370/234 |
| 6,229,788 B1 | * | 5/2001 | Graves et al. | 370/230 |
| 6,359,863 B1 | * | 3/2002 | Varma et al. | 370/232 |

FOREIGN PATENT DOCUMENTS

| | | |
|---|---|---|
| JP | 10-145386 | 5/1998 |
| JP | 10-224368 | 8/1998 |

* cited by examiner

*Primary Examiner*—Ricky Ngo
*Assistant Examiner*—Timothy Lee
(74) *Attorney, Agent, or Firm*—Katten Muchin Zavis Rosenman

(57) ABSTRACT

The present invention aims at providing an ascending transmission speed controlling method and a communication system in an ATM-PON (asynchronous transfer mode-passive optical network), in which ascending transmission speeds on the PON are dynamically allocated corresponding to actual transmission states of communication channels of a best effort type, to thereby effectively utilize respective bands. To this end, according to the present invention, in an OLT (optical line termination) constituting the ATM-PON system, active/inactive states of communication channels are identified based on receiving states of ascending data cells transmitted from ONU's of subscriber side, respectively, and a congestion state of the ATM network is recognized by extracting B-RM (backward resource management) cells from descending data cells, respectively, transmitted from the ATM network, so that ascending transmission speeds on the PON are allocated to communication channels corresponding to service categories, based on such as the thus recognized information.

15 Claims, 10 Drawing Sheets

ASCENDING TRANSMISSION SPEED CONTROLLING METHOD AND COMMUNICATION SYSTEM IN ATM-PON SYSTEM

BACKGROUND OF THE INVENTION

(1) Field of the Invention

The present invention relates to a technique for controlling cell communication in an asynchronous transfer mode (ATM) in an access network in which an optical subscriber line is shared by a plurality of subscribers, and particularly to a method for controlling an ascending transmission speed from a plurality of optical network units to an optical line termination, and a communication system therefor in case of providing a best effort type service which does not guarantee a subscriber's available communication speed in a congested state of the network in a passive optical network (PON) system constituted of an optical line termination at a base station side. and of a plurality of optical network units.

(2) Related Art

FIG. 8 is a block diagram showing a constitution of a common PON system to be connected to an ATM network.

The PON system shown in FIG. 8 is an access network in which optical subscriber lines provided by branching a single optical fiber such as by an optical splitter are shared by a plurality of subscribers. Namely, the system has a basic constitution including a single optical line termination (OLT) 2 connected to an ATM network 1, and a plurality of optical network units (ONU's) 4 connected to the optical line termination 2 via optical splitter 3. The OLT 2 accommodates a plurality of ONU's by a single PON interface, while each of the ONU's 4 accommodates a single or plural user terminal(s) 5.

In the above described PON system, those descending data from the OLT 2 are broadcast toward the respective ONU's 4 in a time-division multiplexing manner, and each of the applicable ONU's 4 takes out relevant information addressed to itself from the descending data. Meanwhile, concerning the ascending data from the respective ONU's 4 to the OLT 2, in order to avoid collision among cells transmitted from the respective ONU's 4, the OLT 2 transmits PLOAM (Physical Layer Operation, Administration, and Maintenance) cells to the ONU's 4, respectively, and each of the ONU's 4 transmits cells at relevant timings in ascending frames as specified by a transmission granting information included in the PLOAM cells. As such, ascending transmission speeds of the respective ONU's 4 in the common PON system have been determined by a transmission period of the transmission granting information included in PLOAM cells to be transmitted from the OLT 2 to the respective ONU's 4.

FIG. 9 shows frame formats of data to be transmitted on the PON system of FIG. 8.

As shown in FIG. 9, first and second PLOAM cells are included in a descending frame. The first PLOAM cell includes transmission granting informations for 1st through 27th cells in an ascending frame, while the second PLOAM cell includes transmission granting informations for 28th through 53rd cells in the ascending frame. Each of the PLOAM cells has a pay load including the contents as shown in the following Table 1.

TABLE 1

| 1 | IDENT | 25 | GRANT20 |
| 2 | SYNC1 | 26 | GRANT21 |
| 3 | SYNC2 | 27 | CRC |
| 4 | GRANT1 | 28 | GRANT22 |
| 5 | GRANT2 | 29 | GRANT23 |
| 6 | GRANT3 | 30 | GRANT24 |
| 7 | GRANT4 | 31 | GRANT25 |
| 8 | GRANT5 | 32 | GRANT26 |
| 9 | GRANT6 | 33 | GRANT27 |
| 10 | GRANT7 | 34 | CRC |
| 11 | CRC | 35 | MESSAGE_PON_ID |
| 12 | GRANT8 | 36 | MESSAGE_ID |
| 13 | GRANT9 | 37 | MESSAGE_FIELD1 |
| 14 | GRANT10 | 38 | MESSAGE_FIELD2 |
| 15 | GRANT11 | 39 | MESSAGE_FIELD3 |
| 16 | GRANT12 | 40 | MESSAGE_FIELD4 |
| 17 | GRANT13 | 41 | MESSAGE_FIELD5 |
| 18 | GRANT14 | 42 | MESSAGE_FIELD6 |
| 19 | CRC | 43 | MESSAGE_FIELD7 |
| 20 | GRANT15 | 44 | MESSAGE_FIELD8 |
| 21 | GRANT16 | 45 | MESSAGE_FIELD9 |
| 22 | GRANT17 | 46 | MESSAGE_FIELD10 |
| 23 | GRANT18 | 47 | CRC |
| 24 | GRANT19 | 48 | BIP |

The GRANTn (n=1 to 27) in Table 1 is a transmission granting information corresponding to an n-th cell of the ascending frame (it is noted that the GRANT27 of the second PLOAM cell is an idle GRANT which does not request any transmission from ONU). The ascending transmission speed of each of ONU's 4 is allocated with a fixed rate based on a peak cell rate (PCR) of each communication channel, irrespectively of a relevant service category and an active/inactive state of the channel.

Each cell in the ascending frame has an overhead comprising a guard time field G for avoiding collision on the transmission line due to transmission fluctuation of ONU's 4, a clock supplying field PR for supplying a clock in an ascending direction, and a field DL for detecting a heading of the ATM cell.

In the ATM-PON type communication system as described above, a band (ascending transmission speed) has been fixedly allocated to each communication channel on the PON, possibly resulting in such a situation that more bands on the PON are allocated than actually used, thereby causing waste of bands. To. avoid such a situation, there has been known a conventional technique for conducting effective allocation of bands, such as disclosed in Japanese Unexamined Patent Publication No. 10-224368 or No. 10-145386.

In an "ATM cell communication method in a passive double star network" disclosed in the former publication, a main device (corresponding to the OLT 2) exchanges control slots with subsidiary devices (corresponding to ONU's 4), to thereby decide activated states of subsidiary devices. During activation of any one of the subsidiary devices, the main device allocates an ascending communication band to the activated one. Conversely, during inactivation of any one of the subsidiary devices, the main device allocates the band, which has been allocated to the inactivated one, to a variable capacity ATM service accommodated in another subsidiary device, to thereby realize an effective band allocation control.

In a "connection setting method in an ATM line concentrator" disclosed in the latter publication, there is established a common path in, which data from subscribers flow between an ATM line concentrator and an ATM switchboard. When the ATM switchboard has received a call from a subscriber accommodated in the ATM line concentrator, the ATM switchboard notifies a band available in the common path to the ATM line concentrator, to thereby simplify setting treatment of connection.

However, there exists a problem as follows, in the aforementioned conventional techniques. Namely, in the method disclosed in the former Japanese Unexamined Patent Publication No. 10-224368, those bands, which have been allocated to the inactivated subsidiary devices, are allocated irrespectively of the traffic amounts (presence/absence of data, bands) of a virtual path (VP) of the variable capacity ATM service being a subject of allocation. Namely, the bands are allocated equally to those VP's of variable capacity ATM service of less traffic amount and to those VP's of variable capacity ATM service of large traffic amount, resulting in that an effective band allocation may not be fully realized. Further, in the method disclosed in the latter Japanese Unexamined Patent Publication No. 10-145386, there may be caused a situation that an actual traffic amount does not exist so much as that of the band established between the ATM line concentrator and the ATM switchboard such as due to congestion of the ATM network, resulting in waste of the difference between the established band and the actual traffic amount.

Meanwhile, there is a best effort type service which does not guarantee a user's available communication speed in a congested state of a network in an ATM communication system. As categories of this service, there are known such as available bit rate (ABR) service, unspecified bit rate (UBR) service, and guaranteed frame rate (GFR) service.

The ABR service means a service in which an ATM network conducts a flow control in response to a congestion state of the network, such that a wide transmission band is allocated to a user terminal in a range between a minimum cell rate (MCR) and a peak cell rate (PCR) when a network resource is not fully used, and the thus allocated transmission band is notified to the user terminal, and a transmission restriction is imposed on a transmitting user terminal when a congestion has occurred in the ATM network. The UBR service means a service in which a band guarantee is not given, but data can be transmitted at a rate up to the PCR when the network resource is not fully used. The GFR service means a service in which the MCR is guaranteed, and data can be transmitted at a rate up to the PCR when the network resource is not fully used.

In the se best effort type services, the transmission speed is increased up to the PCR at the maximum in a situation where the ATM network is not fully used. How ever, in case of occurrence of congestion in the ATM network, the transmission speed is lowered up to the MCR at the minimum according to the flow control at the transmitting terminal of the ABR communication channel; lowered up to the MCR at the minimum at the transmitting terminal of the GFR communication channel; and lowered up to 0 (zero) at the minimum at the transmitting terminal of the UBR communication channel.

Meantime, on a PON, even with the best effort type service, ascending transmission speed of each of communication channels is allocated fixedly with a value equal to or larger than the PCR of the respective communication channels, such as irrespectively of: change of transmission speed due to communicating state such as of the ATM network and transmitting/receiving terminals; and change of an active/inactive state of the respective communication channels themselves. As such, this situation means that a transmission speed larger than actually required is allocated to each of the respective communication channels on the PON, and further that a needless a transmission speed is allocated to a communication channel through which no data cell is transmitted.

There will be now concretely explained a flow control of an ABR channel.

FIG. 10 exemplarily shows an example of transition of a transmission speed of an ABR channel.

As shown in FIG. 10, a transmitting terminal of ABR channel performs transmission at an allowed cell rate (ACR) as an allowed transmission speed represented by an ordinate. Namely, upon starting transmission, the transmission is performed at an initial cell rate (ICR) which is an initial value of the ACR. Then, when the transmitting terminal has received a backward resource management (B-RM) cell via an ATM network, if a CI (Congestion Indication) as a congestion indicator and an NI (No Increase) indicating no increase of the transmission speed, both contained in the B-RM cell, are simultaneously 0 (zero), there is calculated a new ACR' (AC R'=ACR+PCR×RIF) by multiplying PCR by a rate increase factor (RIF) and adding the obtained product to the current ACR. When this ACR' is smaller than an explicit rate (ER) included in the received B-RM cell, it is possible to transmit data at the ACR'. When this ACR' is larger than the ER, it is possible to transmit data at the ACR, by making ACR=ER.

Further, the CI of the received B-RM cell is 1, there is calculated a new ACR' (ACR'=ACR−ACR×RDF) by multiplying ACR by a rate decrease factor (RDF) and subtracting the obtained product from the current ACR. When this ACR' is smaller than the ER of the B-RM cell, it is possible to transmit data at the ACR'. When this ACR' is larger than the ER, it is possible to transmit data at the ACR, by making ACR=ER. Further, when the NI of the received B-RM cell is 1, the transmission may be performed by maintaining the current ACR.

Since the transmission speed of the ABR channel is varied according to the aforementioned flow control such that the ascending transmission speed is fixedly allocated by the PCR on the PON, there is caused a problem that an unused region is left as shown by a shaded portion in FIG. 10.

SUMMARY OF THE INVENTION

The present invention has been carried out in view of the aforementioned points, and it is therefore an object of the present invention to provide an ascending transmission speed controlling method and a communication system in an ATM-PON (asynchronous transfer mode-passive optical network) system, in which ascending transmission speeds on the PON are dynamically allocated corresponding to actual transmission states of communication channels of a best effort type, to thereby effectively utilize respective bands.

To achieve the above object, the present invention provides an ascending transmission speed controlling method in an ATM-PON system, in which the PON system has an optical line termination (OLT) connected to an ATM network and a plurality of optical network units (ONU) each of which is connected to a subscriber terminal to thereby send/receive cell information to/from the optical line termination, and accommodates a plurality of communication channels of best effort type in which a communication speed available by a subscriber is not guaranteed when the ATM network is congested; the method being for controlling transmission speeds of ascending cell informations to be transmitted from the plurality of optical network units to the optical line termination; the method comprising the steps of: identifying, by the optical line termination, whether the communication channels are in active states, respectively, based on receiving states of ascending cell informations from the optical network units, respectively; extracting, by the optical line termination, resource management (RM) cells included in descending cell informations from the ATM network; allocating, by the optical line termination, ascending transmission speeds on the PON to the communication channels, respectively, based on the identified active/inactive states of the communication channels, a congestion state of the ATM network indicated by the extracted resource management cells, and a maximum transmission speed on the PON; generating, by the optical line termination, ascending transmission grant signals to be transmitted to the optical network units according to the allocated ascending transmission speeds; and transmitting, by the optical network units, the ascending cell informations from the subscriber terminals to the optical line termination according to the ascending transmission grant signals from the optical line termination.

According to such a method, actual usage states of communication channels on the PON are identified and the congestion state of the ATM network is recognized by extracting resource management cells, at the optical line termination. Ascending transmission speeds on the PON are allocated to the respective communication channels based on the thus recognized information and a maximum transmission speed (band) on the PON, so that ascending transmission speeds of optical network units are controlled, respectively. In this way, bands on the PON are effectively utilized corresponding to an actual communication state of the network, so that the communication channels of best effort type can be accommodated effectively and flexibly.

The step of allocating ascending transmission speeds may allocates transmission speeds calculated corresponding to the congestion state of the ATM network represented by the extracted resource management cells, as ascending transmission speeds on the PON, respectively, to communication channels the service categories of which are available bit rate (ABR) service and which are in active states, and then, allocates the remaining ascending transmission speeds on the PON, as ascending transmission speeds on the PON, respectively, to communication channels the service categories of which are guaranteed frame rate (GFR) service or unspecified bit rate (UBR) service and which are in active states, according to the number of the corresponding communication channels.

According to such a method, there is conducted a flow control for communication channels of available bit rate service, according to information of the resource management cell. Further, ascending transmission speeds on the PON are allocated to communication channels of guaranteed frame rate service and unspecified bit rate service, corresponding to actual ascending transmission states. In this way, it becomes possible to increase ascending transmission speeds of communication channels in active states, and to avoid such a situation that transmission speeds are wastefully allocated to communication channels in inactive states.

The above method may further comprise the steps of: measuring ratios of actual transmission speeds relative to the transmission speeds allocated by the optical line termination as the ascending transmission speeds on the PON, for those communication channels of guaranteed frame rate service and unspecified bit rate service which are identified as active; and reducing the ascending transmission speeds allocated to the corresponding communication channels to allocate the reduced amount of speed to those communication channels the measured ratios of which are higher than predetermined ratios, when the measured ratios are lower than predetermined values, respectively.

According to such a method, it becomes possible to control the respective communication channels of guaranteed frame rate service and unspecified bit rate service, corresponding to actual ascending transmission speeds, thereby enabling effective utilization of bands on the PON.

The above method may further comprise the step of: inserting, by the optical line termination, resource management cells into ascending cell informations from the optical network units, respectively; and transmitting them to the ATM network, for those communication channels of guaranteed frame rate service and unspecified bit rate service which are identified as active; wherein the step of allocating ascending transmission speeds may allocates transmission speeds calculated corresponding to the congestion state of the ATM network represented by the extracted resource management cells, as ascending transmission speeds on the PON, respectively, to those communication channels of available bit rate service, guaranteed frame rate service and unspecified bit rate service which are in active states, respectively. Preferably, the step of allocating the ascending transmission speeds preferentially allocates ascending transmission speeds on the PON to communication channels of available bit rate service, respectively.

According to such a method, it becomes possible to control ascending transmission speeds on the PON also for communication channels of guaranteed frame rate service and unspecified bit rate service, respectively, according to a flow control by resource management cells, similarly to communication channels of available bit rate service.

Further, the step of allocating ascending transmission speeds may allocate to communication channels in inactive states, those ascending transmission speeds on the PON, which have been previously set corresponding to service categories of the communication channels and then, allocates ascending transmission speeds to communication channels in active states, respectively.

Concretely, the step of allocating ascending transmission speeds may allocate previously set initial cell rates (ICR) to those communication channels of available bit rate service which are in inactive states, as ascending transmission speeds on the PON, allocate previously set minimum cell rates (MCR) to those communication channels of guaranteed frame rate service which are in inactive states, as ascending transmission speeds on the PON, and allocate previously set substantially zero speed to those communication channels of unspecified bit rate service which are in inactive states, as ascending transmission speeds on the PON. Further, when a communication channel has shifted from an inactive state into an active state, the step of allocating the ascending transmission speeds may allocate an ascending transmission speed granted on the PON within a range between a previously set peak cell rate (PCR) or less and a minimum cell rate (MCR) or more if the communication channel is of the guaranteed frame rate service, and, allocate an ascending transmission speed granted on the PON within a range equal to or lower than a previously set peak cell rate (PCR) if the communication channel is of the unspecified bit rate service.

According to such a method, it becomes possible for subscriber terminals corresponding to communication channels in inactive states, to transmit ascending cell informations at any time.

In the above method, it is preferred that: the optical network units change the ascending transmission speeds at timings earlier by predetermined time lengths than timings at which ascending transmission speeds of the subscriber terminals are changed, respectively, when the optical network units increase the ascending transmission speeds according to the ascending transmission grant signals from the optical line termination, respectively, and the optical network units change the ascending transmission speeds at timings later by predetermined time lengths than timings at which ascending transmission speeds of the subscriber terminals are changed, respectively, when the optical network units decrease the ascending transmission speeds according to the ascending transmission grant signals from the optical line termination, respectively.

According to such a method, there can be avoided such a situation that cell informations transmitted from subscriber terminal to optical network unit are overflowed due to failure of reservation of band on the PON.

In the above method, when each of the optical network units accommodates a plurality of communication channels of different service categories, the each of the optical network units may distributingly write ascending cell informations transmitted from the subscriber terminals into a plurality of buffers corresponding to priority of the service categories, respectively, and transmits ascending cell informations stored in the buffers in an order of precedence from the highest priority, to the optical line termination according to ascending transmission grant signals from the optical line termination, respectively.

According to such a method, the transmission of ascending data cells from optical network units to the optical line termination can be effectively conducted, corresponding to precedence of the respective communication channels.

The present invention further provides an ATM-PON type communication system in which the PON system has an optical line termination connected to an ATM network, and a plurality of optical network units each of which is connected to a subscriber terminal to thereby send/receive cell information to/from the optical line termination, and accommodates a plurality of communication channels of best effort type in which a communication speed available by a subscriber is not guaranteed when the ATM network is congested, wherein the optical line termination comprises: an active state identifying device for identifying whether the communication channels are in active states, respectively, based on receiving states of ascending cell informations from the optical network units, respectively; a resource management cell extracting device for extracting resource management cells included in descending cell informations from the ATM network; a transmission speed controlling device for allocating transmission speeds on the PON to the communication channels, respectively, based on active/ inactive states of the communication channels identified by the active state identifying device, on a congestion state of the ATM network indicated by the resource management cells extracted by the resource management cell extracting device, and on a maximum transmission speed on the PON; and a transmission grant signal generating device for generating the ascending transmission grant signals to be transmitted to the optical network units according to the ascending transmission speeds allocated by the transmission speed controlling device, respectively, wherein each of the optical network units comprises an ascending transmission device for transmitting the ascending cell informations from the subscriber terminals toward the optical line termination according to the ascending transmission grant signals from the transmission grant signal generating device.

Concerning the above ATM-PON type communication system, the optical line termination may include a speed measuring device for measuring actual ascending transmission speeds of those communication channels which are identified as active by the active state identifying device, and the transmission speed controlling device may adjust ascending transmission speeds on the PON allocated to the communication channels corresponding to actual transmission speeds measured by the speed measuring device, respectively.

Alternatively, the optical line termination may include a resource management cell generating device for inserting resource management cells into ascending cell informations from the optical network units, respectively, and transmitting them to the ATM network, for those communication channels of guaranteed frame rate service and unspecified bit rate service which are identified as active by the active state identifying device.

Further, it is preferred that when the ascending transmission device of each of the optical network units accommodates a plurality of communication channels of different service categories, the ascending transmission device of the each of the optical network units comprises: a plurality of buffers corresponding to priority of the service categories, respectively; a channel distributing part for distributingly writing ascending cell informations transmitted from the subscriber terminals into the buffers corresponding to the service categories; and a buffer selecting part for transmitting ascending cell informations stored in the buffers in an order of precedence from the highest priority, to the optical line termination according to ascending transmission grant signals from the optical line termination, respectively.

Further objects, features and advantages of the present invention will become more apparent from the following description of preferred embodiments when read in conjunction with the accompanying drawings.

DETAILED DESCRIPTION OF THE PREFERRED EMBODIMENT

There will be described hereinafter embodiments according the present invention, with reference to the accompanying drawings.

Figure 1:
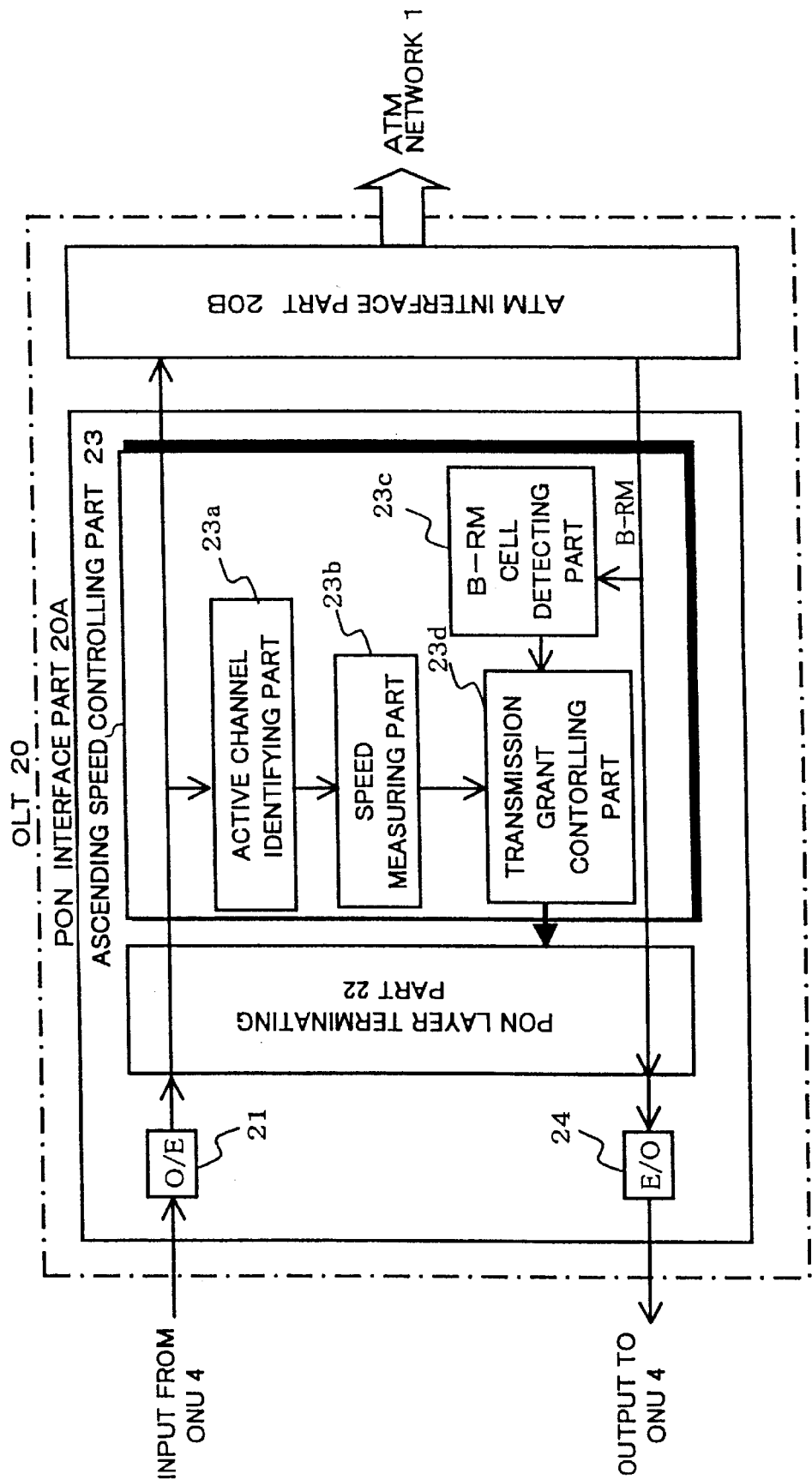
FIG. 1 is a block diagram showing a constitution of an OLT used in a first embodiment of the present invention.
Figure 2:
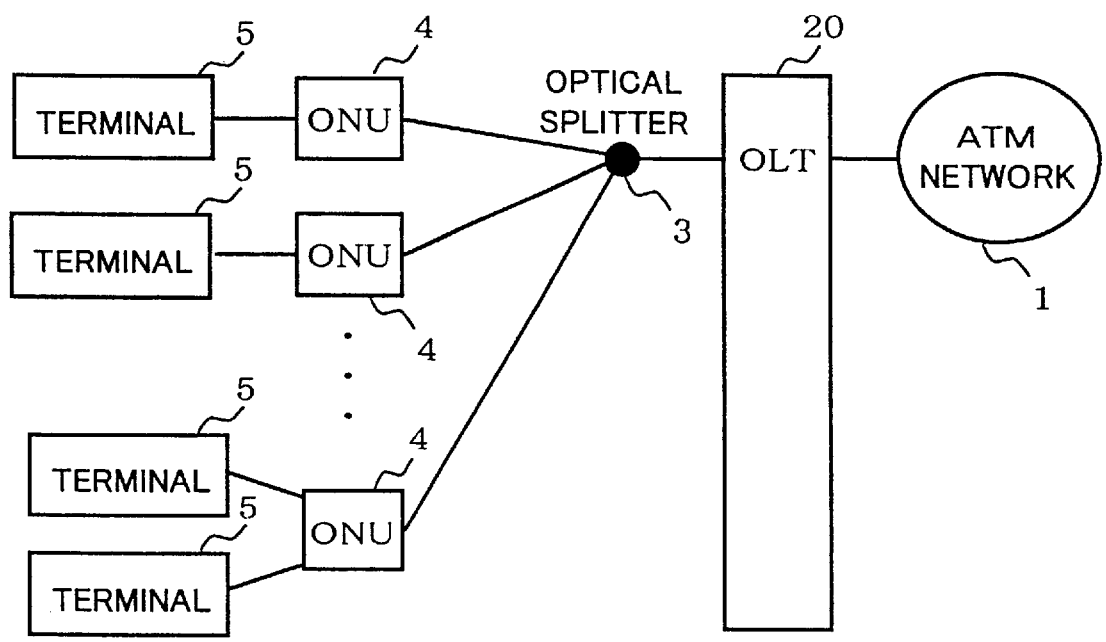
FIG. 2 is a block diagram showing a constitution of a PON system of the first embodiment.

FIG. 1 is a functional block diagram showing a constitution of an optical line termination (OLT) to be used in an ATM-PON type communication system to which an ascending transmission speed controlling method according to a first embodiment of the present invention is applied. FIG. 2 is a block diagram showing a whole constitution of a PON system connected to an ATM network. The elements identical with those of the aforementioned conventional constitution are accompanied by the same reference numerals.

Figure 8:
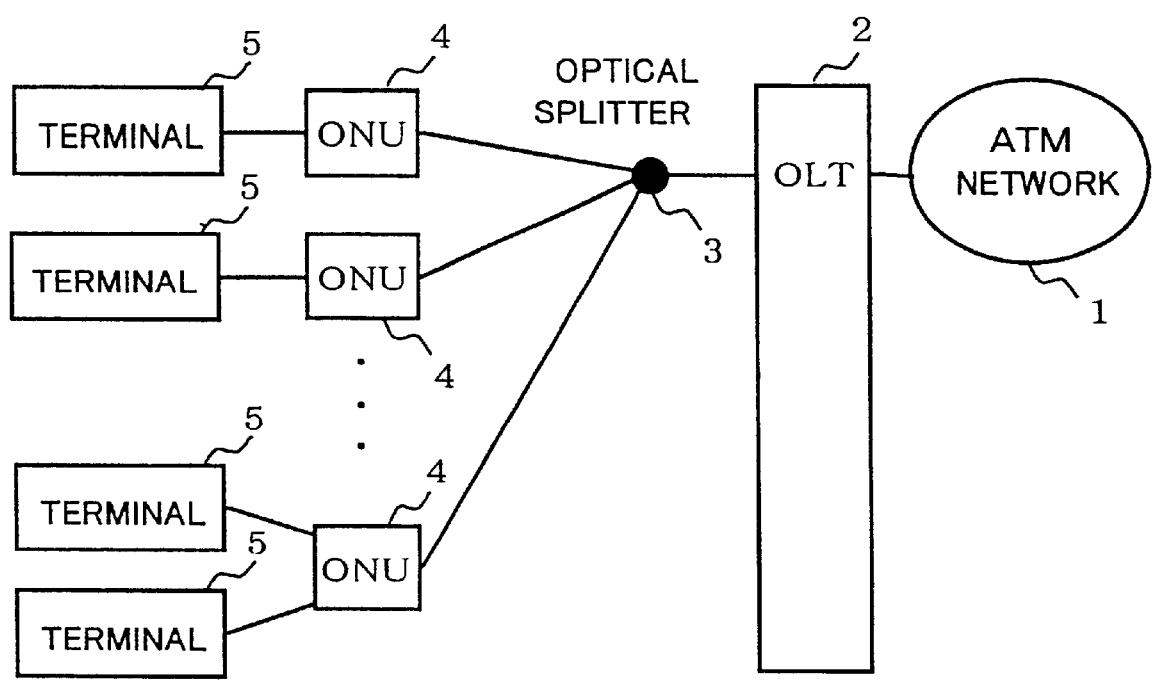
FIG. 8 is a block diagram showing a constitution of a common PON system.

The PON system shown in FIG. 2 has a single optical line termination (OLT) 20 connected to an ATM network 1, and a plurality of optical network units (ONU's) 4 connected to the OLT 20 via an optical splitter 3. The OLT 20 accommodates a plurality of ONU's 4 by a single PON interface, while each of the ONU's 4 accommodates a single or plural user (subscriber) terminal(s) 5. The characterizing part of the first embodiment resides in a functional constitution of the OLT 20, and other parts (ATM network 1, optical splitter 3, ONU's 4 and user terminals 5) are identical with those of the common constitution shown in FIG. 8.

As shown in FIG. 1, the OLT 20 is provided with a PON interface part 20A connected to the ONU's 4, and an ATM interface part 20B connected to the ATM network 1. The PON interface part 20A has a light receiving part (O/E) 21, a PON layer terminating part 22, an ascending speed controlling part 23, and a light emitting part (E/O) 24.

The light receiving part 21 converts optical ascending signals transmitted via optical splitter 3 from the respective ONU's 4, into electric signals, to output them to the PON layer terminating part 22. The PON layer terminating part 22 transmits the signals from the light receiving part 21 to the ascending speed controlling part 23, and at the same time, creates a PLOAM (Physical Layer Operation, Administration, and Maintenance) cell in response to signals sent from the ascending speed controlling part 23, adds this PLOAM cell to a descending signal, and transmits the same to the light emitting part 24. The light emitting part 24 converts the electric signal from the PON layer terminating part 22 into an optical signal, to send this signal to the respective ONU's 4 via the optical splitter 3. Here, the PON layer terminating part 22 functions as a transmission grant signal generating device.

The ascending speed controlling part 23 has an active channel identifying part 23a as active state identifying device, a speed measuring part 23b as speed measuring device, a B-RM cell detecting part 23c as a resource management cell extracting device, and a transmission grant controlling part 23d as a transmission speed controlling device. The active channel identifying part 23a monitors receiving cells for respective communication channels concerning the ascending signals from the PON layer terminating part 22, and recognizes those communication channels as active channels through which a data cell has arrived within a predetermined observation period. However, when a data cell is not received within a predetermined period from the communication channel has been recognized to be active, the communication channel is recognized to be inactive. The speed measuring part 23b monitors the number of cells in a predetermined time period for those communication channels recognized as active by the active channel identifying part 23a, and calculates transmission speeds of the active channels. The B-RM cell detecting part 23c extracts a B-RM cell from a data cell received from the ATM network 1 via the ATM interface part 20B. At intervals of the aforementioned predetermined observation period, the transmission grant controlling part 23d calculates band allocations on the PON for the respective communication channels based on: the number of active channels; the transmission speeds of the active channels; the service categories of the active channels; the B-RM cell information for ABR channels; and a maximum transmission speed on the PON, to output a signal for controlling the ascending transmission speeds of the ONU's 4, to the PON layer terminating part 22.

The ATM interface part 20B is provided with functions such as a multiplexing/demultiplexing function for transmitted data, and a switching function for an ATM connection. This ATM interface part 20B is identical with that one provided in the common OLT 2.

There will be described hereinafter an operation of the ATM-PON type communication system having the aforementioned constitution.

Firstly, there is briefly explained a flow control method for an ABR service in the ATM network 1. As the flow control method for the ABR service in the ATM network 1, there is known such as an explicit rate (ER) marking method, and an explicit forward congestion indication (EFCI) marking method.

Figure 3:
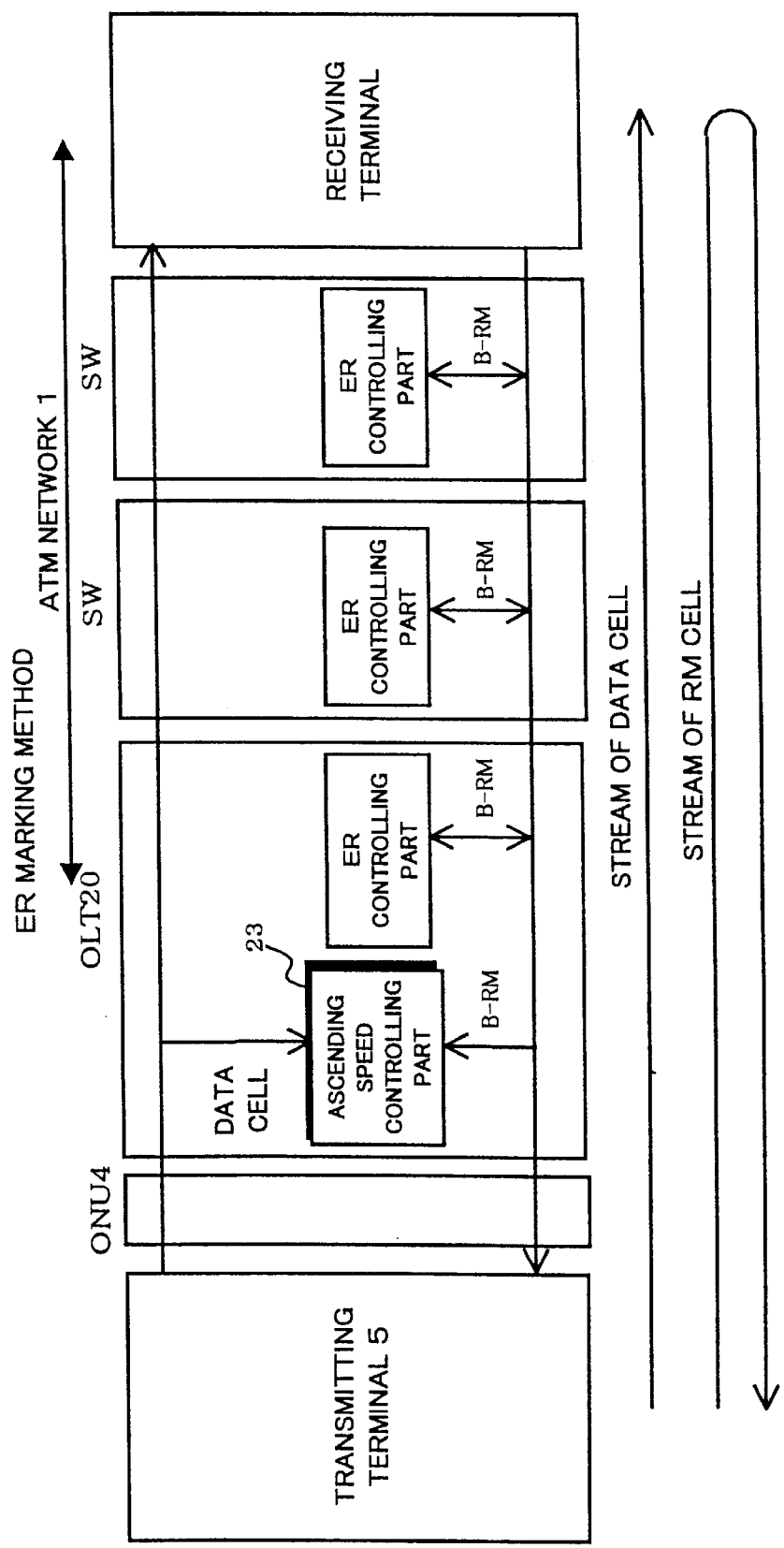
FIG. 3 is a conceptional view for explaining a flow control of an ER marking method for an ABR channel, in the first embodiment.

FIG. 3 is a view showing flows of data cells and resource management (RM) cells, in case of adopting the ER marking method.

As shown in FIG. 3, in the ER marking method, those devices (OLT's, SW's) including ATM switchboard arranged in the ATM network 1 notify a state of ATM network to a transmitting terminal, by modifying, at respective ER controlling parts, the aforementioned respective values CI, NI and ER included in the backward resource management (B-RM) cell transmitted from a receiving terminal to a transmitting terminal, based on a network state such as unused band, congestion state, and imminent congestion. Shown in FIG. 3 is a situation where the ER controlling parts modify the respective values of the B-RM cell. However, the ER controlling parts may modify the respective values such as CI included in a forward resource management (F-RM) cell transmitted from a transmitting terminal to a receiving terminal.

Figure 4:
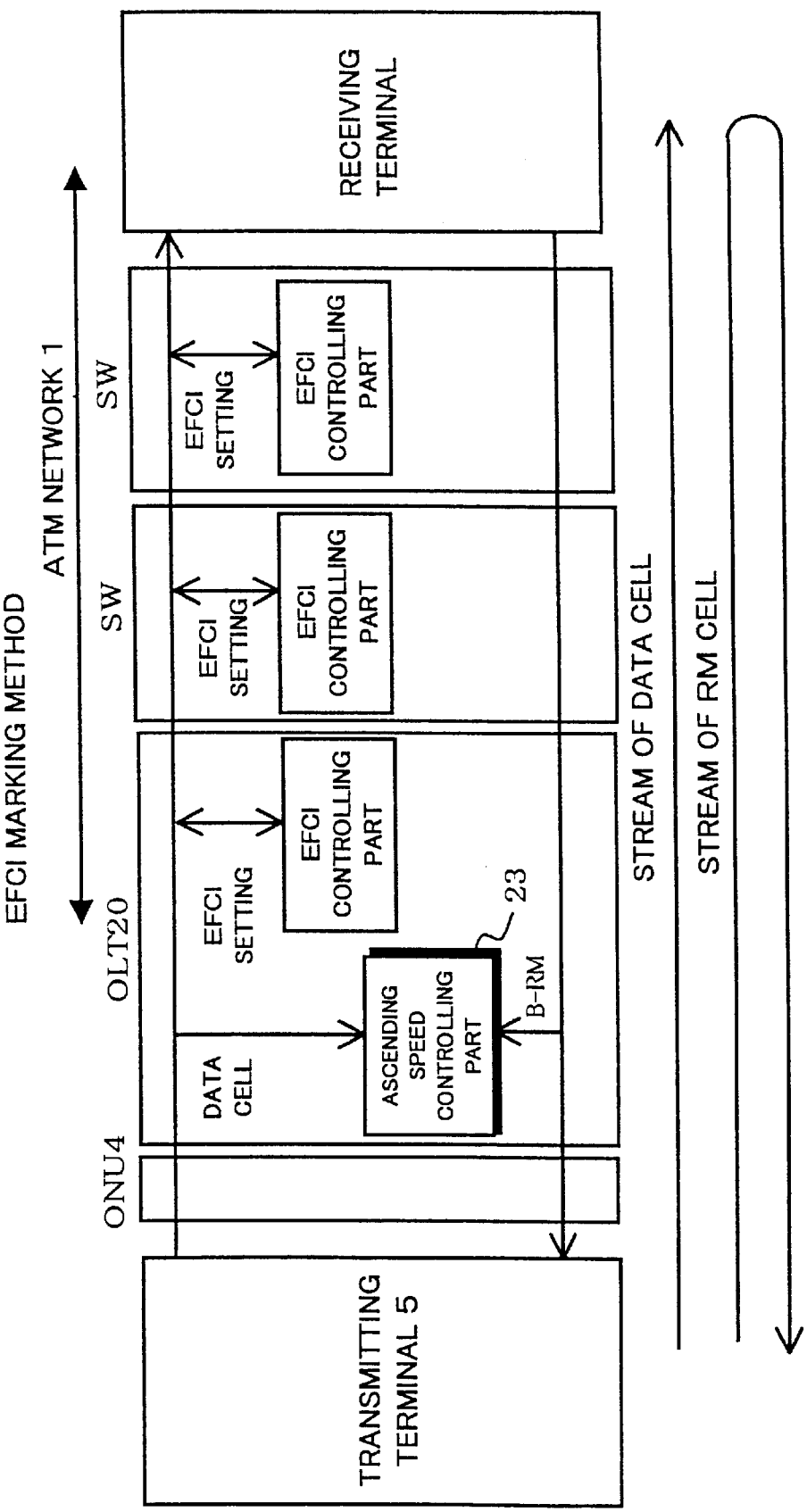
FIG. 4 is a conceptional view for explaining a flow control of an EFCI marking method for an ABR channel, in the first embodiment.

FIG. 4 is a view showing flows of data cells and RM cells, in case of adopting the EFCI marking method.

As shown in FIG. 4, in the EFCI marking method, those devices (OLT's, SW's) including ATM switchboard which are incapable of modifying the respective values of CI, NI and ER included in the F-RM cell, write an occurrence of congestion as an EFCI, into a data cell. Further, a receiving terminal of the ABR channel, which has received this data cell, sets the CI value of the B-RM cell to "1" indicative of congestion, to notify this value to a transmitting terminal.

The system of the present embodiment can be applied to either of the ER marking method and the EFCI marking method. Then, the ascending transmission speeds of the respective service channels on the PON are controlled at the ascending speed controlling part 23 provided in the OLT 20 connected to the PON, based on the B-RM cell information of the ABR channel.

There will be concretely described hereinafter an ascending transmission speed controlling method in the present system, mainly about the operation of the OLT 20.

Firstly, in an initial state, the transmission grant controlling part 23d of the OLT 20 allocates ascending transmission speeds on the PON to the respective ONU's 4, irrespectively of active/inactive states of the respective communication channels. Concretely, an initial cell rate (ICR) is allocated to the ABR channel, a minimum cell rate (MCR) is allocated to a GFR channel, and a speed of substantially zero is allocated to a UBR channel.

It is also possible to allocate a value as a transmission speed to the UBR channel in the initial state, which value is obtained by multiplying a peak cell rate (PCR) by a predetermined coefficient corresponding to a volume of the PCR at a time when subscribed for the UBR communication channel.

Upon starting of transmissions of the respective communication channels, the respective ONU's 4 can transmit ascending data cells onto the PON, according to the initially set transmission speeds, respectively. Those transmitted ascending data cells are sent to the PON interface part 20A of the OLT 20 via optical splitter 3. At this time, there is also sent a forward resource management (F-RM) cell together with a data cell, to the ABR channel.

At the PON interface part 20A, those ascending data cells from the respective ONU's 4 are transmitted to the ascending speed controlling part 23, through the light receiving part 21 and the PON layer terminating part 22. In the ascending speed controlling part 23, there is always monitored a receiving state of an ascending data cell at the active channel identifying part 23a. Upon detecting receipt of a data cell on a communication channel, this communication channel is identified as being active, and this result is transmitted to the transmission grant controlling part 23d via the speed measuring part 23b. Further, for the communication channel as recognized active, the transmission speed is measured at the speed measuring part 23b by counting the number of cells within a predetermined period of time, and this result is also transmitted to the transmission grant controlling part 23d.

The ascending data cells (including F-RM cell, as to ABR channel) passed through the ascending speed controlling part 23 are transmitted via the ATM interface part 20B to the ATM network 1 and then up to a receiving terminal. Further, the receiving terminal creates descending cells in response to receipt of the ascending data cells, and the descending cells are then backwardly transmitted to a transmitting terminal. During such a bidiretional cell transmission in the ATM network 1, there is performed for the ABR channel the modification of the backward resource management (B-RM) cell, based on the congestion state of the ATM network 1, as shown in FIGS. 3 and 4.

Those descending cells of ABR channel, which have returned up to the OLT 20, are sent to the ascending speed controlling part 23 of the PON interface part 20A via the ATM interface part 20B, and the B-RM cell detecting part 23c extracts a B-RM cell from the descending cells and transmits it to the transmission grant controlling part 23d.

The transmission grant controlling part 23d determines the congestion state of the ATM network 1 depending on the information indicated by the B-RM cell sent from the B-RM cell detecting part 23c, and determines an actual band usage state on the PON connected to the OLT 20 depending on the information on active channels sent via the speed measuring part 23b, to thereby optimize the band allocations (transmission speeds) to the respective communication channels on the PON. The bands on the PON are preferentially allocated to the active ABR channels, and the remaining bands are allocated to the active GFR and UBR channels, to thereby realize optimization herein.

Figure 10:
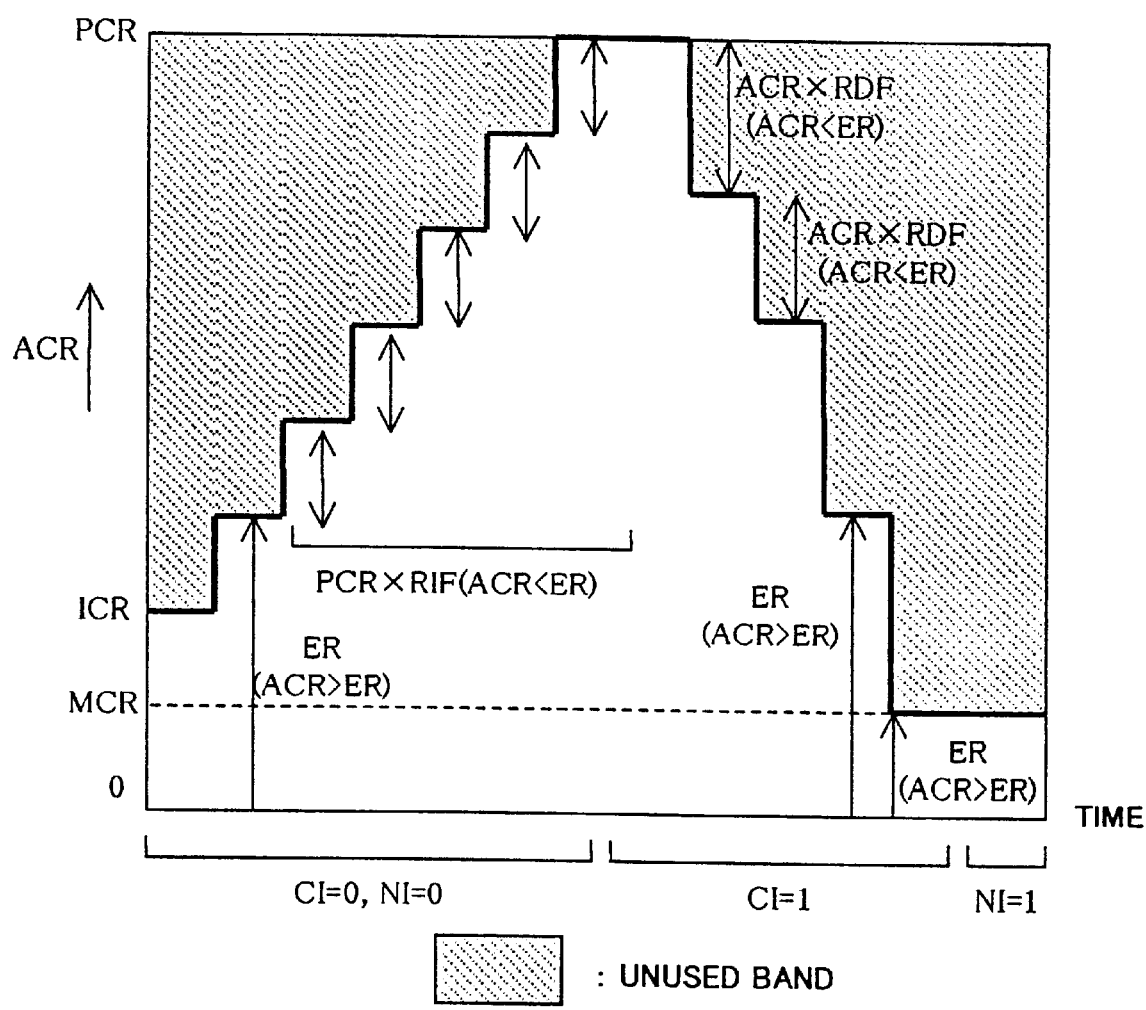
FIG. 10 is a view showing an example of transition of a transmission speed of an ABR channel.

Concretely, the allocation of bands to ABR channel is performed in a manner basically identical with that shown in FIG. 10. Namely, the transmission grant controlling part 23d refers to the content of the B-RM cell sent from the B-RM cell detecting part 23c. When no congestion has occurred in the ATM network 1 and the increase of transmission speed is possible (i.e., CI=NI=0), the transmission grant controlling part 23d calculates a new ACR' (ACR'=ACR+PCR× RIF) by adding a value obtained by multiplying the peak cell rate (PCR) by a rate increase factor (RIF) to a current allowed cell rate (ACR), compares this ACR' with an ER value included in the received B-RM cell, and then allocates the smaller one of them as a transmission speed to the ABR channel. When congestion has occurred in the ATM network 1 (i.e., CI=1), the transmission grant controlling part 23d calculates a new ACR' (ACR'=ACR−ACR×RDF) by subtracting a value obtained by multiplying the ACR by a rate decrease factor (RDF) from a current ACR, compares this ACR' with an ER value of the B-RM cell, and then allocates the smaller one of them as a transmission speed to the ABR channel. Further, when the current transmission speed is to be maintained (i.e., NI=1), the current ACR itself is allocated as a transmission speed to the ABR channel.

After the allocation of bands on the PON to ABR channels as described above, there are calculated allocations of bands to GFR and UBR active channels.

Concretely, when a communication channel is identified as active at the active channel identifying part 23a and this active channel is a GFR channel or a UBR channel, the transmission grant controlling part 23d obtains a speed by subtracting a total speed allocated to inactive channels and a total speed of active ABR channels from a maximum ascending transmission speed on the PON, calculates a speed by dividing the subtractedly obtained speed by the number of active GFR and UBR channels, and allocates a band on the PON, which corresponds to the dividedly obtained speed, to the active GFR or UBR channel.

At this time, when the speed of active GFR channel is calculated to be the MCR or less, the MCR shall be allocated to the respective active GFR channels. In such a case, the total speed allocated to inactive channels, the total speed of active ABR channels, and a total speed of the MCR of active GFR channels are subtracted from the maximum ascending transmission speed on the PON, this subtractedly obtained speed is divided by the number of the active UBR channels, and a band on the PON which corresponds to this dividedly obtained speed is allocated to the respective active UBR channels.

With respect to the GFR channel and UBR channel, after the communication channel is recognized as active, the number of data cells is counted by the speed measuring part 23b at intervals of a predetermined period to thereby calculate an actual transmission speed of each of the active channel, and this result is transmitted to the transmission grant controlling part 23d. When the ratio of the calculated actual transmission speed relative to the allocated transmission speed on the PON is lower than a predetermined ratio, the transmission grant controlling part 23d allocates a reduced value obtained by multiplying the actual transmission speed by a predetermined coefficient, to the corresponding communication channel as a new transmission speed. The reduced amount of speed resulted from this modification shall be re-allocated to that communication channel which has a higher ratio of the actual transmission speed relative to the allocated transmission speed on the PON than a predetermined ratio. This kind of situation may occur, when the transmission speed can be hardly increased due to some cause on the transmitting terminal side or the ATM network side.

Further, the active channel identifying part 23a monitors whether a communication channel once identified as active has shifted to inactive. Concretely concerning GFR and UBR channels, the channel is identified to have shifted to inactive when no data cells are received during a predetermined period, and this result is notified to the transmission grant controlling part 23d. On this occasion, at the transmission grant controlling part 23d, an inactive state transmission speed is allocated to that communication channel which has shifted to an inactive state, and then, the transmission speeds for continuously active GFR and UBR channels are re-allocated in a manner same with the aforementioned re-allocation. Concerning ABR channel, the channel is identified to have shifted to inactive when no data cells are received during a lapse of an ADTF (ACR Decrease Time Factor) time from the receipt time of the last cell. On this occasion, at the transmission grant controlling part 23d, the speed allocated to the ABR channel which has shifted to inactive is reset to the ICR, and the transmission speeds for continuously active GFR and UBR channels are re-allocated.

Figure 9:
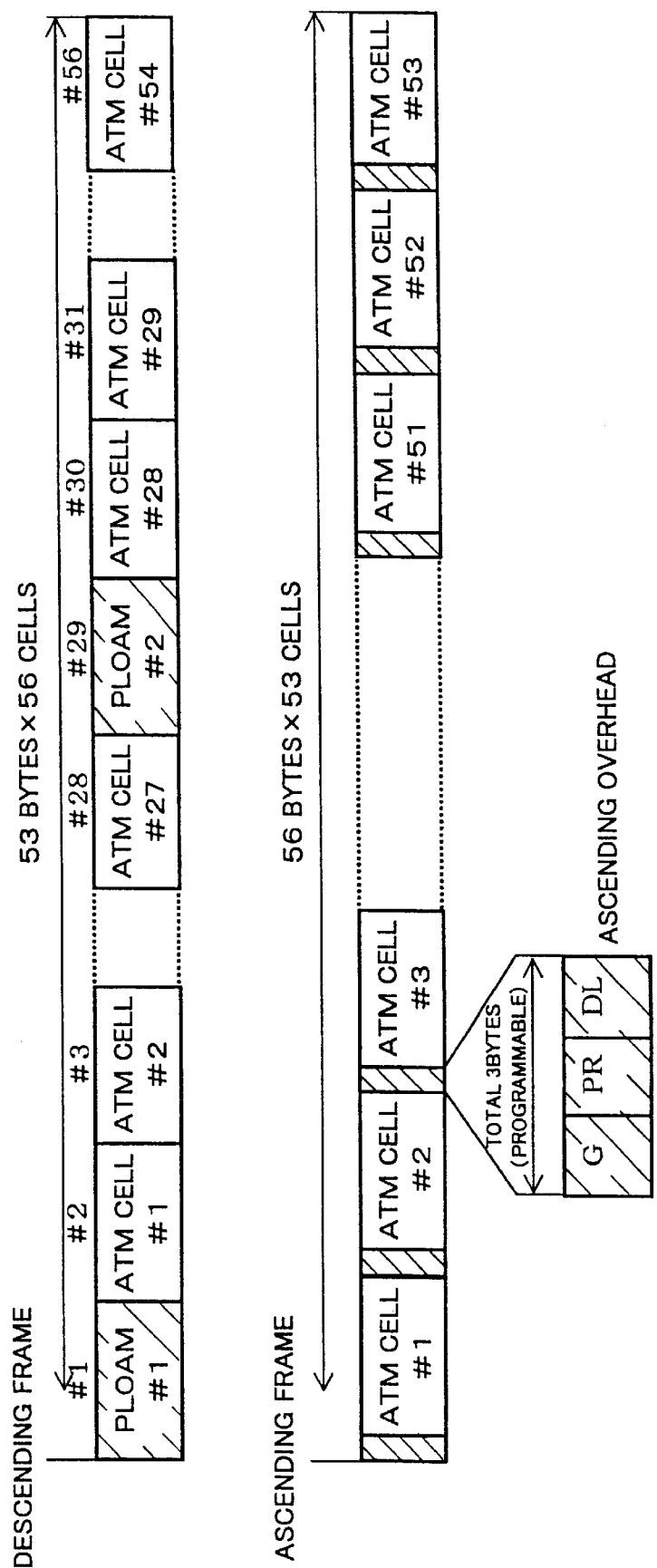
FIG. 9 is a view showing a format of a frame transmitted on the PON.

When the transmission grant controlling part 23d has determined the allocation of bands on the PON to the respective ABR, GFR and UBR communication channels, the transmission grant controlling part 23d outputs a signal indicative of the result to the PON layer terminating part 22. At the PON layer terminating part 22, there are created the PLOAM cells (see the above Table 1) to be transmitted to the ONU's 4 corresponding to the communication channels, respectively, and these PLOAM cells are added to the descending frame (see the aforementioned FIG. 9). In these PLOAM cells, the transmission periods of the transmission granting informations (GRANT) for the respective ONU's 4 are adjusted according to the signal from the transmission grant controlling part 23d, so that the ascending transmission speeds of the ONU's 4 are controlled.

The descending signal output by the PON layer terminating part 22 is sent onto the PON via the light emitting part 24, and then transmitted to the respective ONU's 4 through the optical splitter 3. The ONU's 4 in turn transmit data cells sent from the user terminals 5 at those timings of the ascending frame, which are specified by the transmission granting informations included in the PLOAM cells from the OLT 20.

Figure 5:
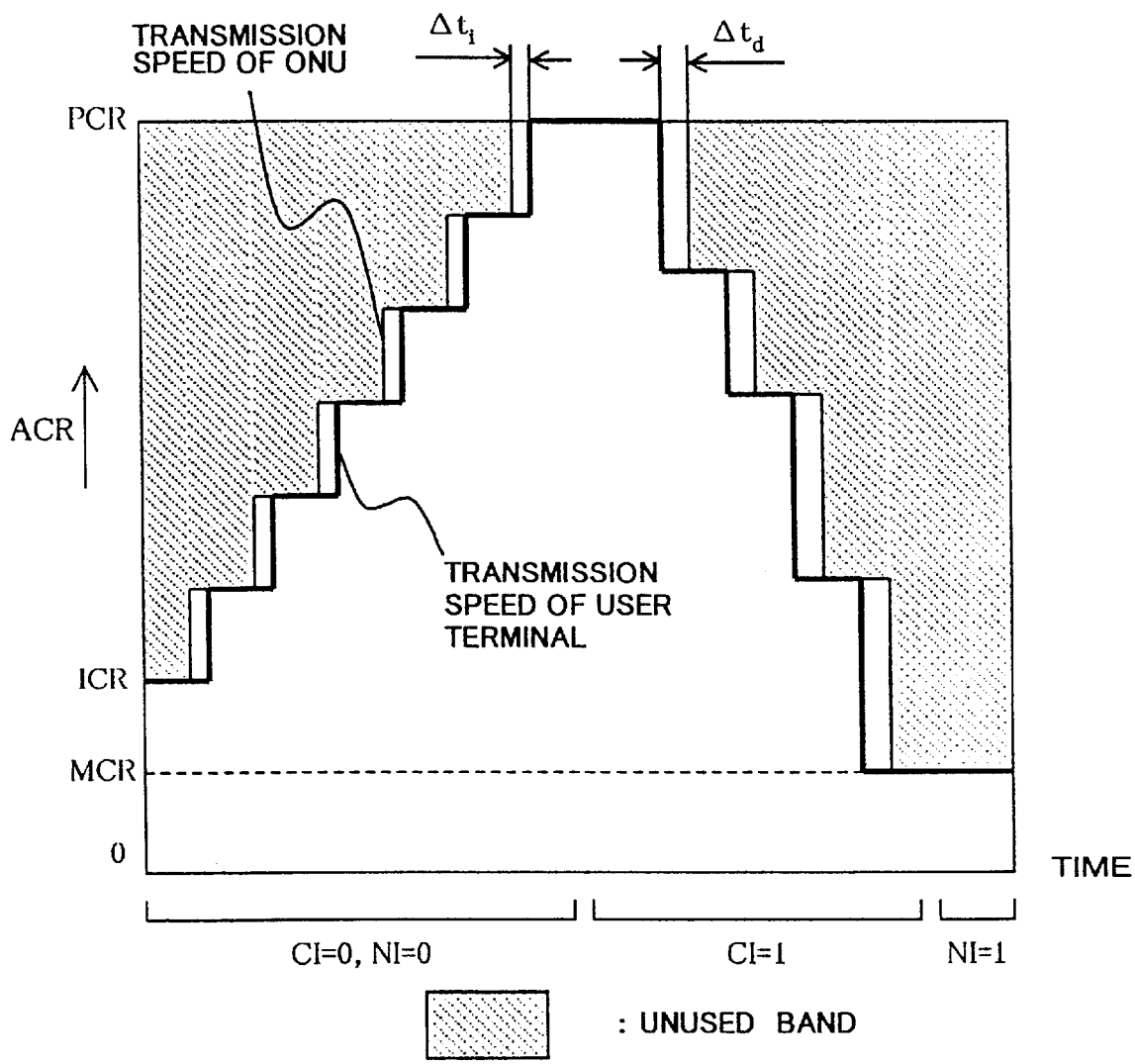
FIG. 5 is a view showing an example of a preferable switch timing of a transmission speed, in the first embodiment.

It is preferred that such a pattern as shown in FIG. 5 is used for the switching timing of the transmission speed of data to be transmitted from the user terminal 5 to ONU 4, relative to the actual switching timing of the ascending transmission speed by the ONU 4 according to the PLOAM cell from the OLT 20. In FIG. 5, the actual transmission speed pattern of user terminal 5 which transmits data such as of an ABR channel is represented by a thick line, while the transmission speed pattern at which the ONU 4 connected to that user terminal 5 actually transmits the ascending data cell onto the PON is represented by a thin line. Concretely, it is convenient to consider the situation by distinguishing a case where the transmission speed of data cell is to be increased from a case where the same is to be decreased.

In case of increasing the transmission speed of data cell, the timing of ONU 4 for increasing the transmission speed is set to be earlier by a time length $\Delta t_i$ than the timing of user terminal 5 for increasing the transmission speed. Contrary, in case of decreasing the transmission speed of data cell, the timing of ONU 4 for decreasing the transmission speed is set to be later by a time length $\Delta t_d$ than the timing of user terminal 5 for decreasing the transmission speed. Those time lengths $\Delta t_i$ and $\Delta t_d$ are suitably set corresponding to such as a distance from the user terminal 5 up to the ONU 4. By setting the switching timing in this way, there can be avoided such a situation that the data transmitted from the user terminal 5 to the ONU 4 is overflowed due to failure of reservation of band on the PON.

According to the first embodiment as described above, there is provided the ascending speed controlling part 23 in the OLT 20, and bands on the PON are allocated to the respective communication channels while monitoring actual transmission states of ascending data cells. Thus, it becomes possible to guarantee for ABR channel an allowed transmission speed according to the flow control by the ATM network 1, and to simultaneously allocate bands on the PON evenly to GFR and UBR channels corresponding to transmission speeds of data cells being actually transmitted in active states of the channels. In this way, contrary to the conventional technique, there is avoided such a situation that bands on the PON are wastefully allocated, contrary to the best effort type communication channels through which no data cells may be transmitted. Thus, there can be realized an ATM-PON type communication system which can increase utilization efficiency of ascending transmission speed on the PON, and effectively and flexibly accommodate the best effort type communication channels.

There will be described hereinafter a second embodiment of the present invention.

Figure 6:
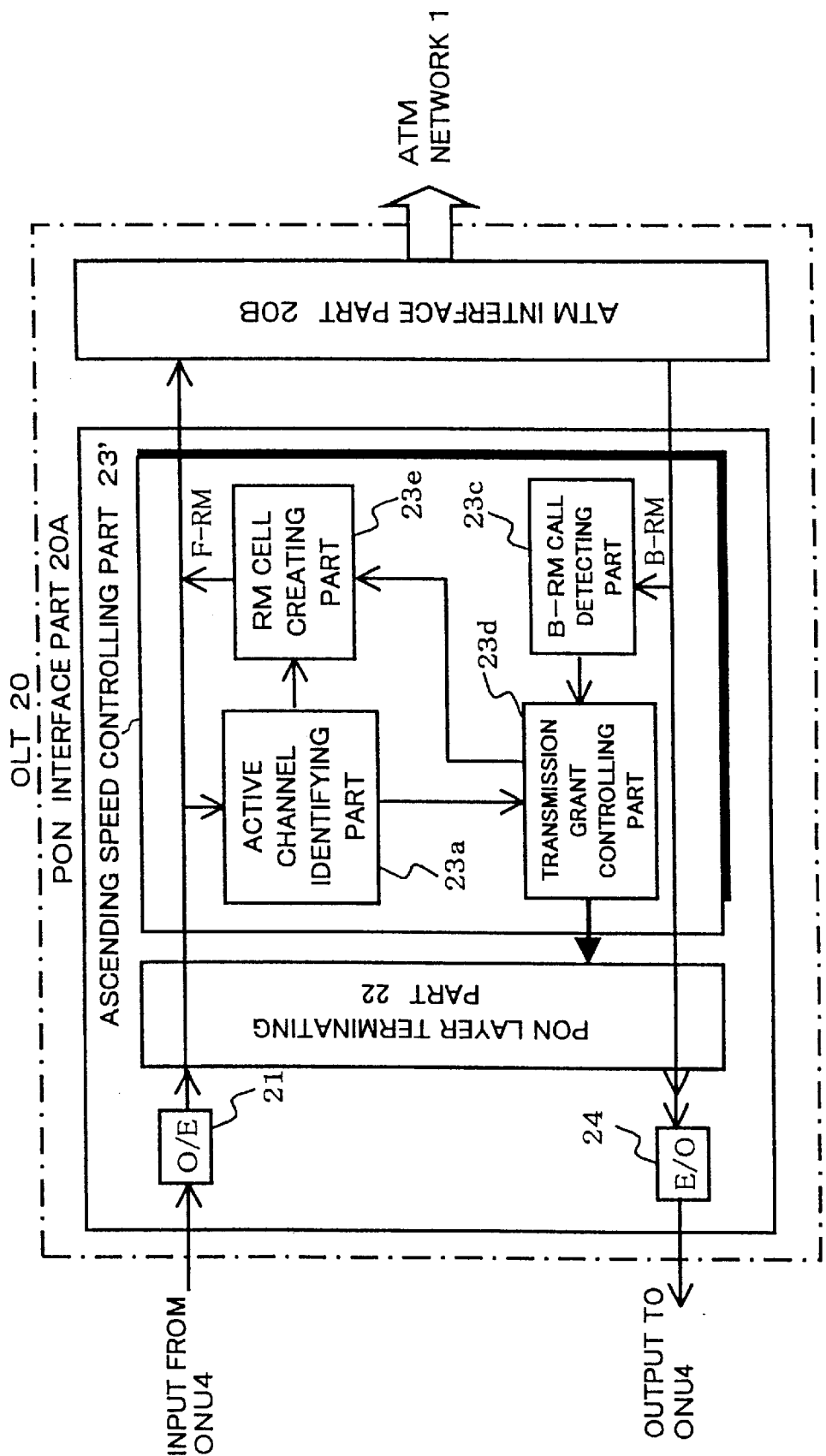
FIG. 6 is a block diagram showing a constitution of an OLT used in a second embodiment of the present invention.

FIG. 6 is a functional block diagram showing a constitution of an OLT to be used in an ATM-PON type communication system to which an ascending transmission speed controlling method according to the second embodiment of the present invention is applied. The whole constitution of the PON system connected to the ATM network is identical with that of the first embodiment shown in FIG. 2, so that the explanation thereof is omitted.

In FIG. 6, the OLT 20 of the second embodiment is constitutionally different from that of the first embodiment in that there is provided an ascending speed controlling part 23' which is provided with an RM cell creating part 23e as a resource management cell creating device instead of the above described speed measuring part 23b. The OLT 20 has a constitution identical with that of the first embodiment, except for the ascending speed controlling part 23' and the RM cell creating part 23e within it.

The RM cell creating part 23e has a function to insert an F-RM cell into ascending data cells for UBR and GFR channels in communication channels which have been sent from ONU's 4 to the OLT 20 via the optical splitter 3, and then input to the ascending speed controlling part 23' through the PON layer terminating part 22. This F-RM cell is identical with an F-RM cell which is to be inserted into an ascending data cell of an ABR channel at a transmitting terminal 5, and CI, NI and ER of this F-RM cell are set based on the informations provided by the corresponding parts of the ascending speed controlling part 23'. The respective values of the F-RM cell will be described later herein.

The reason why the RM cell creating part 23e is provided in the ascending speed controlling part 23' and the GFR and UBR channels are also inserted with F-RM cell, is to also realize a flow control of GFR and UBR channels in the ATM network 1, similarly to ABR channel. Namely, since ascending data cells of GFR and UBR channels transmitted from the transmitting terminal 5 typically have no information corresponding to the RM cell, it is difficult for the PON side to be notified of the information on a congestion state of connection set in the ATM network 1. As such, the RM cell creating part 23e is made to insert an F-RM cell into ascending data cells of GFR and UBR channels when the ascending data cells of GFR and UBR channels pass through the PON interface part 20A of the OLT 20, so that signals of GFR and UBR channels transmitted in the ATM network 1 can be treated similarly to those of ABR channel, resulting in that a B-RM cell modified corresponding to a congestion state of the ATM network 1 is returned to the OLT 20 in a manner as shown in FIG. 3 or FIG. 4.

There will be concretely described hereinafter an ascending transmission speed controlling method in the second embodiment, mainly about the operation of the OLT 20.

In a manner identical with the first embodiment, there are conducted operations during an initial state of this system, and operations until active/inactive states of communication channels are identified at the active channel identifying part 23a of the OLT 20 after starting transmission of communication channels.

When an active channel is identified at the active channel identifying part 23a, this result is notified to the transmission grant controlling part 23d and RM cell creating part 23e. Only when the active channel is GFR or UBR channel, the RM cell creating part 23e sets a transmission speed request transmitted from the transmission grant controlling part 23d to be an ER, CI to be zero, and NI to be zero, to thereby create an F-RM cell, and then inserts the cell into an ascending data cell. It is supposed that the ER value just after starting transmission of GFR or UBR channel shall be set with an initial value previously set in the RM cell creating part 23e. There will be described later a transmission speed request from the transmission grant controlling part 23d.

The ascending data cells (including F-RM cell) of respective communication channels passed through the ascending speed controlling part 23' are transmitted via the ATM interface part 20B to the ATM network 1 and then up to the receiving terminal. Further, the receiving terminals create descending data cells (including B-RM cell) in response to receipt of the ascending data cells, and the descending data cells are then backwardly transmitted to the transmitting terminal. During such a bidirectional cell transmission, there are performed for ABR, GFR and UBR channels the modification of the RM cells, depending on the congestion state of the ATM network 1.

Those descending data cells of respective communication channels, which have returned up to the OLT 20, are sent to the ascending speed controlling part 23' of the PON interface part 20A via the ATM interface part 20B, and the B-RM cell detecting part 23c extracts B-RM cells from the descending data cells and transmits them to the transmission grant controlling part 23d.

The transmission grant controlling part 23d determines the congestion state of the ATM network 1 concerning ABR, GFR and UBR active channels, based on the information included in B-RM cells sent from the B-RM cell detecting part 23c and information from the active channel identifying part 23a, to thereby optimize the band allocations (transmission speeds) to the respective communication channels on the PON.

The allocation of band for ABR channel is performed in a manner identical with the aforementioned first embodiment. Contrary, the allocation of bands to GFR and UBR channels is set according to the information of B-RM cell, differently from the first embodiment. Namely, the allocation of bands to GFR and UBR channels is performed in a manner basically identical with that to ABR channel. Only, to realize that, it is required to previously conduct a subscription for a setting such as of initial cell rate (ICR), rate increase factor (RIF) and rate decrease factor (RDF), also about GFR and UBR channels.

The transmission grant controlling part 23d also calculates the aforementioned transmission speed request to be transmitted to the RM cell creating part 23e. Concretely, the transmission grant controlling part 23d calculates a speed (ACR+PCR×RIF) by adding a product of PCR multiplied by RIF to the ACR, as the transmission speed request for GFR and UBR channels, and sends the request to the RM cell creating part 23e, in which the ACR indicates an ascending transmission speed allocated in a manner identical with ABR channel. At this time, when the total speed of the respective active channels exceeds the maximum transmission speed on the PON, the ascending transmission speed is preferentially allocated to active ABR channels, and then there are reduced ACR's calculated as the transmission speeds to be allocated to active UBR channel and active GFR channel, to thereby avoid such a situation that the total transmission speed of the respective communication channels exceeds the maximum transmission speed on the PON.

Further, the active channel identifying part 23a monitors whether a communication channel once identified as active has shifted to inactive. Concretely concerning ABR, GFR and UBR channels, the channel is identified to have shifted to inactive when no data cells are received during a lapse of an ADTF time from the receipt time of the last cell. On this occasion, at the transmission grant controlling part 23d, the ICR is allocated to that communication channel which has shifted to an inactive state.

According to the second embodiment as described above, GFR and UBR channels are also treated identically with ABR channel, by adding an RM cell to the formers, thereby enabling transmission of data cells corresponding to a congestion state of the ATM network 1 for all communication channels of a best effort type. Thus, it becomes possible to avoid such as waste of data cells due to occurrence of congestion in the ATM network 1, and transmission of unnecessary data cell to the ATM network 1.

There will be described hereinafter a third embodiment of the present invention.

In this third embodiment, the ONU's 4 used in the first or second embodiment are improved, to thereby effectively conduct transmission of ascending data cell to the OLT 20, corresponding to preference of communication channels.

Figure 7:
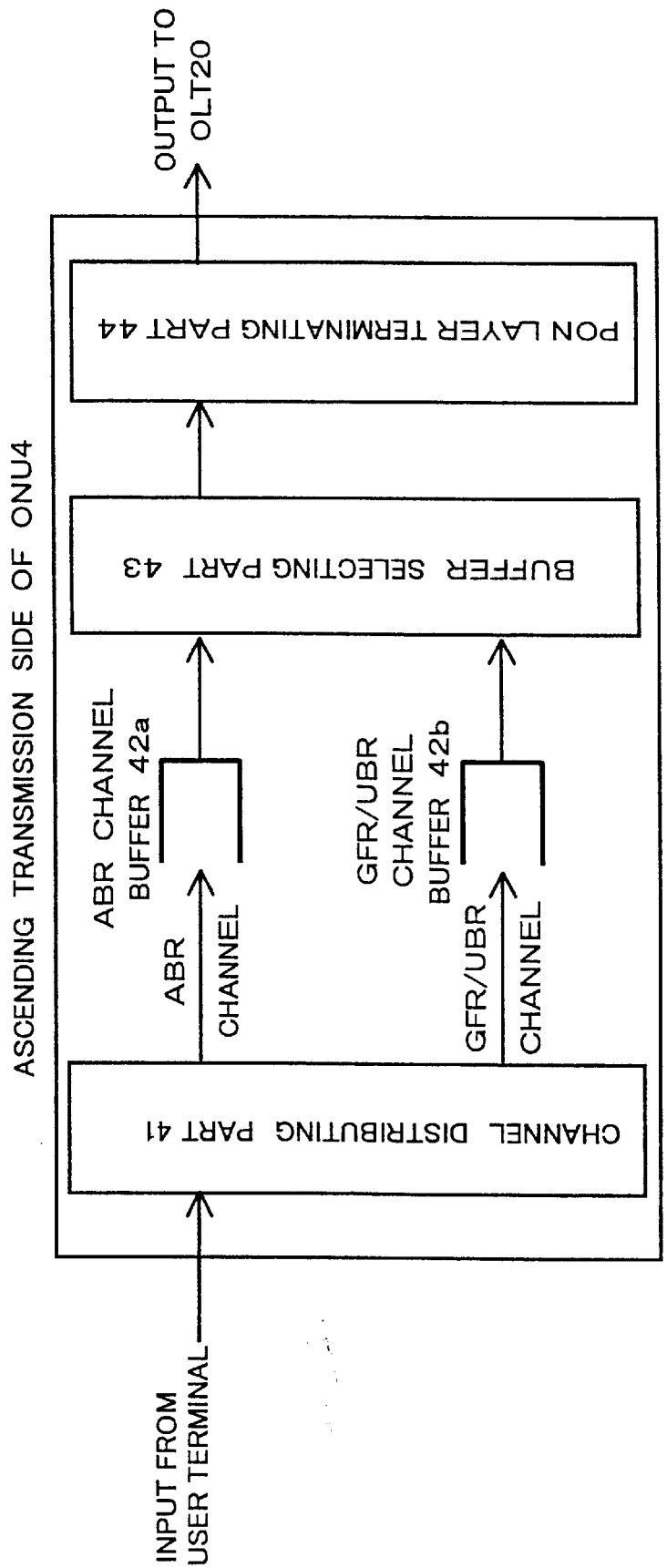
FIG. 7 is a block diagram showing a constitution of an ONU used in a third embodiment of the present invention.

FIG. 7 is a block diagram showing a constitution of an ascending transmission side of ONU used in the third embodiment.

In FIG. 7, the ascending transmission side of ONU 4 has a channel distributing part 41, an ABR channel buffer 42a, a GFR/UBR channel buffer 42b, a buffer selecting part 43 and a PON layer terminating part 44. Data cells transmitted from user terminals 5 are input into the channel distributing part 41, and the service categories of the inputted data cells are identified. When identified as an ABR channel, the corresponding data cell is written into the ABR channel buffer 42a. When identified as a GFR or UBR channel, the corresponding data cell is written into the GFR/UBR channel buffer 42b. The buffer selecting part 43 selects one of the ABR channel buffer 42a and GFR/UBR channel buffer 42b according to a transmission granting information included in the PLOAM cell transmitted from the OLT 20, and outputs the data cell written in the selected buffer to the PON layer terminating part 44. This PON layer terminating part 44 inserts the data cell from the buffer selecting part 43 into an ascending frame, and transmits the frame to the OLT 20.

According to such a constitution, data cells of ABR, GFR and UBR channels transmitted from a single or plural user terminal(s) 5 are input into the channel distributing part 41 to thereby be divided into ABR channel, and GFR or UBR channel, and then written into the individual buffers 42a, 42b. At this time, the buffer selecting part 43 is detecting presence/absence of data cell written into the respective buffers 42a, 42b.

When the PLOAM cell transmitted from the OLT 20 includes a transmission granting information designating the buffer selecting part 43 itself, this buffer selecting part 43 firstly confirms whether the ABR channel buffer 42a contains a data cell. In case of existence of data cell in the ABR channel buffer 42a, the data cell is preferentially transmitted from the buffer 42a at a predetermined timing. In case of absence of data cell in the ABR channel buffer 42a, the buffer selecting part 43 confirms whether the GFR/UBR channel buffer 42b contains a data cell. In case of existence of data cell in the GFR/UBR channel buffer 42b, the data cell is transmitted from the buffer 42b at a predetermined timing. Contrary, in case of absence of data cell in both of the ABR channel buffer 42a and GFR/UBR channel buffer 42b at the time of receiving the transmission granting information, the buffer selecting part 43 sends an idle cell at a predetermined timing.

The data cell transmitted from the buffer selecting part 43 at the predetermined timing is inserted into an ascending frame at the PON layer terminating part 44, then sent onto the PON, and further transmitted to the OLT 20 via the optical splitter 3.

According to the third embodiment as described above, in the ONU 4 to which communication channels of different service categories are transmitted, there are provided plural buffers 42a, 42b different from each other for priority of the communication channels, and data cells transmitted from the user terminal 5 are temporarily stored in the buffers. Further, upon receiving of ascending transmission grant, the data cell of ABR channel is preferentially transmitted. Thus, the transmission of ascending data cell to the OLT 20 can be effectively conducted corresponding to the precedence of communication channels.

We claim:

1. An ascending transmission speed controlling method in an ATM-PON (asynchronous transfer mode-passive optical network) system in which said PON system has an optical line termination connected to an ATM network and a plurality of optical network units each of which is connected to a subscriber terminal to thereby send/receive cell information to/from said optical line termination, and accommodates a plurality of communication channels of best effort type in which a communication speed available by a subscriber is not guaranteed when said ATM network is congested; said method being for controlling transmission speeds of ascending cell informations to be transmitted from said plurality of optical network units to said optical line termination; said method comprising the steps of:

monitoring, by said optical line termination, receiving states of ascending cell informations from said optical network units, respectively to identify whether said communication channels are in active states, respectively, based on a result of monitoring;

extracting, by said optical line termination, backward resource management cells included in descending cell informations, respectively, from said ATM network;

allocating, by said optical line termination, ascending transmission speeds on said PON to said communication channels, respectively, based on said identified active/inactive states of said communication channels, a congestion state of said ATM network indicated by said extracted resource management cells, and a maximum transmission speed on said PON;

generating, by said optical line termination, ascending transmission grant signals to be transmitted to said optical network units according to said allocated ascending transmission speeds, respectively; and transmitting, by said optical network units, the ascending cell informations from said subscriber terminals to said optical line termination according to said ascending transmission grant signals, respectively, from said optical line termination.

2. An ascending transmission speed controlling method in an ATM-PON system of claim 1, wherein said step of allocating ascending transmission speeds allocates transmission speeds calculated corresponding to the congestion state of said ATM network represented by said extracted resource management cells, as ascending transmission speeds on said PON, respectively, to communication channels the service categories of which are available bit rate service and which are in active states; and then, allocates the remaining ascending transmission speeds on said PON, as ascending transmission speeds on said PON, respectively, to communication channels the service categories of which are guaranteed frame rate service or unspecified bit rate service and which are in active states, according to the number of the corresponding communication channels.

3. An ascending transmission speed controlling method in an ATM-PON system of claim 2, further comprising the steps of:

measuring ratios of actual transmission speeds relative to said transmission speeds allocated by said optical line termination as said ascending transmission speeds on said PON, for those communication channels of guaranteed frame rate service and unspecified bit rate service which are identified as active; and reducing ascending transmission speeds allocated to the corresponding communication channels, and allocating the reduced amount of rate to those communication channels the measured ratios of which are higher than predetermined ratios, respectively, when the measured ratios are lower than predetermined values, respectively.

4. An ascending transmission speed controlling method in an ATM-PON system of claim 1, further comprising the step of:

inserting, by said optical line termination, resource management cells into ascending cell informations from said optical network units, respectively, and transmitting them to said ATM network, for those communication channels of guaranteed frame rate service and unspecified bit rate service which are identified as active;

wherein said step of allocating ascending transmission speeds allocates transmission speeds calculated corresponding to the congestion state of said ATM network represented by said extracted resource management cells, as ascending transmission speeds on said PON, respectively, to those communication channels of available bit rate service, guaranteed frame rate service and unspecified bit rate service which are in active states.

5. An ascending transmission speed controlling method in an ATM-PON system of claim 4, wherein said step of allocating ascending transmission speeds preferentially allocates ascending transmission speeds on said PON to communication channels of available bit rate service, respectively.

6. An ascending transmission speed controlling method in an ATM-PON system of claim 1, wherein said step of allocating ascending transmission speeds allocates to communication channels in inactive states, those ascending transmission speeds on said PON, respectively, which have been previously set corresponding to service categories of said communication channels; and then, allocates ascending transmission speeds to communication channels in active states, respectively.

7. An ascending transmission speed controlling method in an ATM-PON system of claim 6, wherein said step of allocating ascending transmission speeds allocates previously set initial cell rates to those communication channels of available bit rate service which are in inactive states, as ascending transmission speeds on the PON, respectively, allocates previously set minimum cell rates to those communication channels of guaranteed frame rate service which are in inactive states, as ascending transmission speeds on the PON, respectively, and allocates previously set substantially zero rates to those communication channels of unspecified bit rate service which are in inactive states, as ascending transmission speeds on the PON, respectively.

8. An ascending transmission speed controlling method in an ATM-PON of claim 7, wherein, when a communication channel has shifted from an inactive state into an active state, said step of allocating ascending transmission speeds allocates an ascending transmission speed granted on said PON within a range between a previously set peak cell rate or less and a minimum cell rate or more if the communication channel is of the guaranteed frame rate service, and allocates an ascending transmission speed granted on said PON within a range equal to or lower than a previously set peak cell rate if the communication channel is of the unspecified bit rate service.

9. An ascending transmission speed controlling method in an ATM-PON system of claim 1, wherein said optical network units change said ascending transmission speeds at timings earlier by predetermined time lengths than timings at which ascending transmission speeds of said subscriber terminals are changed, respectively, when said optical network units increase said ascending transmission speeds according to said ascending transmission grant signals from said optical line termination, respectively.

10. An ascending transmission speed controlling method in an ATM-PON system of claim 1, wherein said optical network units change said ascending transmission speeds at timings later by predetermined time lengths than timings at which ascending transmission speeds of said subscriber terminals are changed, respectively, when said optical network units decrease said ascending transmission speeds according to said ascending transmission grant signals from said optical line termination, respectively.

11. An ascending transmission speed controlling method in an ATM-PON system of claim 1, wherein, when each of said optical network units accommodates a plurality of communication channels of different service categories, said each of said optical network units distributingly writes ascending cell informations transmitted from said subscriber terminals into a plurality of buffers corresponding to priority of said service categories, respectively, and transmits ascending cell informations stored in said buffers in an order of precedence from the highest priority, to said optical line termination according to ascending transmission grant signals from said optical line termination, respectively.

12. An ATM-PON (asynchronous transfer mode-passive optical network) type communication system in which said PON system has an optical line termination connected to an ATM network and a plurality of optical network units each of which is connected to a subscriber terminal to thereby send/receive cell information to/from said optical line termination, and accommodates a plurality of communication channels of best effort type in which a communication speed available by a subscriber is not guaranteed when said ATM network is congested;

wherein said optical line termination comprises:

active state identifying means for monitoring receiving states of ascending cell information from said optical network units, respectively to identifying whether said communication channels are in active states, respectively, based on a result of monitoring;

resource management cell extracting means for extracting backward resource management cells included in descending cell informations from said ATM network;

transmission speed controlling means for allocating transmission speeds on said PON to said communication channels, respectively, based on active/inactive states of said communication channels identified by said active state identifying means, on a congestion state of said ATM network indicated by said resource management cells extracted by said resource management cell extracting means, and on a maximum transmission speed on said PON; and transmission grant signal generating means for generating ascending transmission grant signals to be transmitted to said optical network units according to said ascending transmission speeds allocated by said transmission speed controlling means, respectively; and wherein each of said optical network units comprises:

ascending transmission means for transmitting the ascending cell informations from said subscriber terminals to said optical line termination according to said ascending transmission grant signals from said transmission grant signal generating means.

13. An ATM-PON type communication system of claim 12, wherein said optical line termination includes speed measuring means for measuring actual ascending transmission speeds of those communication channels which are identified as active by said active state identifying means; and wherein said transmission speed controlling means adjusts ascending transmission speeds on said PON allocated to said communication channels corresponding to actual transmission speeds measured by said speed measuring means, respectively.

14. An ATM-PON type communication system of claim 12, wherein said optical line termination includes resource management cell generating means for inserting resource management cells into ascending cell informations from said optical network units, respectively, and transmits them to said ATM network, for those communication channels of guaranteed frame rate service and unspecified bit rate service which are identified as active by said active state identifying means.

15. An ATM-PON type communication system of claim 12, wherein, when said ascending transmission means of each of said optical network units accommodates a plurality of communication channels of different service categories, said ascending transmission means of said each of said optical network units comprises: a plurality of buffers corresponding to priority of said service categories, respectively; a channel distributing part for distributingly writing ascending cell informations transmitted from said subscriber terminals into said buffers corresponding to said service categories; and a buffer selecting part for transmitting ascending cell informations stored in said buffers in an order of precedence from the highest priority, toward said optical line termination according to ascending transmission grant signals from said optical line termination, respectively.

* * * * *